(12) United States Patent
Sawatzki et al.

(10) Patent No.: US 6,430,279 B2
(45) Date of Patent: *Aug. 6, 2002

(54) METHOD FOR THE ACCEPTANCE OF CALLING CHARGES FOR INDIVIDUAL CALLS AS WELL AS TELEPHONE NETWORK AND TERMINAL UNIT

(75) Inventors: Roland Sawatzki, Neu-Ulm; Rolf Stiefel, Gerlingen, both of (DE)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/310,928

(22) Filed: May 13, 1999

(30) Foreign Application Priority Data

May 14, 1998 (DE) .......................... 198 21 584

(51) Int. Cl.⁷ .................. H04M 15/00; H04M 17/00
(52) U.S. Cl. ................. 379/144.01; 379/112.01; 379/114.01; 379/114.22; 379/114.23; 455/406
(58) Field of Search ................. 379/111, 112, 379/114, 115, 121, 126, 144, 112.01, 114.01, 114.05, 114.22, 114.23, 114.28, 115.01; 455/405, 406, 407, 408

(56) References Cited

U.S. PATENT DOCUMENTS

| | | | |
|---|---|---|---|
| 4,879,742 A | | 11/1989 | Taniguchi et al. |
| 5,381,467 A | * | 1/1995 | Rosinski et al. ............. 379/121 |
| 5,557,664 A | * | 9/1996 | Burns et al. ................. 379/114 |
| 5,563,933 A | | 10/1996 | August et al. |
| 5,577,100 A | | 11/1996 | McGregor et al. |
| 5,579,379 A | * | 11/1996 | D'Amico et al. ............ 379/112 |
| 5,754,633 A | * | 5/1998 | Levy ........................... 379/114 |
| 5,822,411 A | * | 10/1998 | Swale et al. ................ 379/111 |
| 5,835,573 A | * | 11/1998 | Dee et al. ..................... 379/89 |
| 5,963,625 A | * | 10/1999 | Kawecki et al. ............. 379/114 |
| 5,991,749 A | * | 11/1999 | Morrill, Jr. ................... 705/44 |
| 6,047,051 A | * | 4/2000 | Ginzboorg et al. ........... 379/130 |
| 6,169,891 B1 | * | 1/2001 | Gorham et al. .............. 455/408 |
| 6,280,722 B1 | * | 3/2001 | Sawatzki et al. ......... 379/144.01 |

FOREIGN PATENT DOCUMENTS

| | | |
|---|---|---|
| DE | 41 11 192 A1 | 10/1992 |
| DE | 42 22 235 A1 | 1/1994 |
| DE | 44 11 271 A1 | 10/1995 |
| DE | 195 11 031 A1 | 10/1996 |
| DE | 196 44 386 A1 | 4/1998 |
| DE | 196 38 116 A1 | 5/1998 |
| GB | 2 308 528 A | 6/1997 |

OTHER PUBLICATIONS

Allerback, Mechthild, Fischer, Norbert: "Mobile" Kommunikation mit HICOM–Chipkarte. In: telcom report 9, 1986, H. 4, S.270–276, No translation.

Wurzer, Kurt: Telefonzelle mit Intelligenz. In: telcom report 13, 1990, H. 1, S.32–34, No translation.

ETSI, Integrated Services Digital Network (ISDN); reverse charging unconditional (REV–U) supplementary service, DE/NA–10017 Version 4, Jan. 1994.

\* cited by examiner

*Primary Examiner*—Binh Tieu
*Assistant Examiner*—Quoc D. Tran
(74) *Attorney, Agent, or Firm*—Sughrue Mion, PLLC

(57) ABSTRACT

In a method to accept call charges by the calling subscriber (A) for individual calls over a telephone network (1), following an agreement on the allocation of the charges between two subscribers, the calling subscriber (A) sends a caller-specific signal as binding confirmation of this agreement, whereupon the calling subscriber (B) accepts the call. The caller-specific signal can be stored in the form of a digital code on a smart card (9).

14 Claims, 1 Drawing Sheet

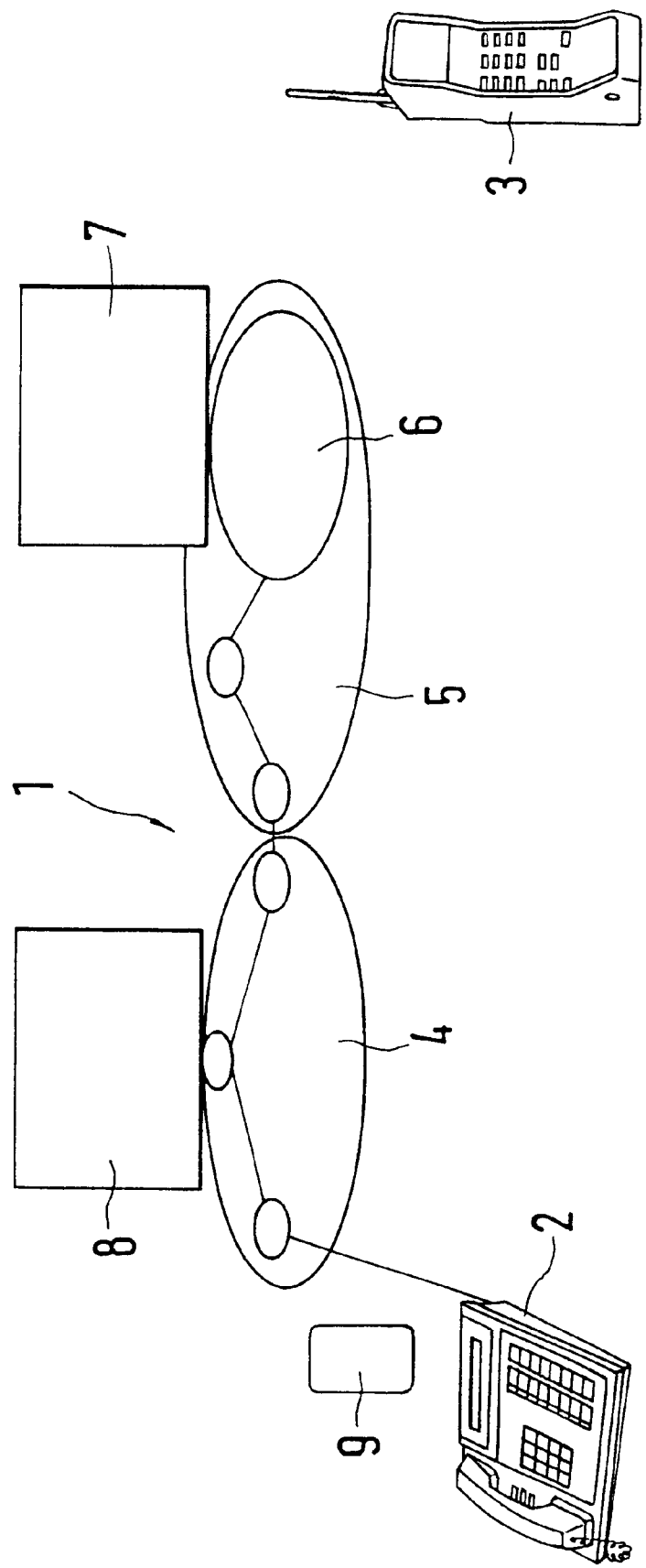

METHOD FOR THE ACCEPTANCE OF CALLING CHARGES FOR INDIVIDUAL CALLS AS WELL AS TELEPHONE NETWORK AND TERMINAL UNIT

This application is based on and claims the benefit of German Patent Application No. 198 21 584.3 filed May 14, 1998, which is incorporated by reference herein.

BACKGROUND OF THE INVENTION

In one aspect, this invention relates to a method for the acceptance of calling charges by the calling subscriber for individual calls over a telephone network, as well as to a corresponding telephone network and a corresponding terminal unit.

Under certain circumstances, in particular in a GSM (Global System for Mobile Communication), both the calling subscriber and the called subscriber must pay calling charges when a call is made. The decision of the called subscriber whether or not to accept the call may depend on whether he has to pay the call charge, as well as the amount of that charge. For example, GSM users, when they are in areas covered by other networks (designated "roaming"), e.g. in another country, must pay fees based on the distance of the roaming area from their home area, even when they receive unwanted calls. To give the subscriber control over his telephone calls, a called subscriber should therefore be able to decide whether he will accept a call or not.

In similar systems of the prior art, the calling charges for a telephone call can be accepted by the user if the call is made through an operator. In such a case, the acceptance of the calling charge for a telephone call to be made is agreed upon by the calling subscriber and the operator of the telephone network.

The prior art also includes the acceptance of calling charges by the calling party in an ISDN telephone network. The ETSI Publication DE-NA-10017, January 1994, entitled "Integrated Services Digital Network" explains the method as used in an ISDN telephone network. The user can also pre-select connections over a permanent network, for which an agreement regarding the acceptance of fees has been made with the network operator. It is also possible, however, to signal the acceptance of fees if such a service has been requested by the caller. In that case, the user must use a password that is input into the telephone terminal unit in the form of a combination of characters to indicate his user ID to the network operator. This service for the acceptance of charges must be set up for each individual user. The function of the acceptance of charges in the ISDN fixed network is bound to a specified subscriber connection.

DE-OS 42 22 235 discloses a telephone system, the terminal units of which are operated with a smart card. The smart card contains a personal billing number for the calling charges, which number is verified by checking it against the numbers stored in a file by the telephone system. The individual terminal units can then only be operated if the personal billing number of the respective user authorizes said user to make a call. To put the method into practice, the telephone terminals contain a card reader that is capable of reading the information stored on a smart card. The prior art also teaches the use of SIM (Subscriber Identity Module) cards, for use, for example, in GSM cellular telephone networks. These cards contain a personal identification number, an algorithm and a personal subscriber code for the generation of authentication information which is transmitted to a switchboard, where the user's authorization is verified. The use of the smart cards of the prior art makes it possible to make calls, but not to accept charges that result from a call from a third party.

SUMMARY OF THE INVENTION

The object of the invention is to create a method for the acceptance of calling charges by the calling subscriber, which method is independent of a specific subscriber connection. Additional objects of the invention are a terminal unit and a telephone network by means of which the method can be put into practice.

One advantage of the invention is that the called subscriber can make a binding and irrevocable charge allocation agreement with the calling subscriber and, thus, the called subscriber can be protected against a subsequent rejection by the calling subscriber of the charge allocation agreement negotiated.

The invention teaches a method of the type described above, in which, on the basis of a charge allocation agreement between two subscribers, the calling subscriber transmits a caller-specific signal as a binding acceptance of this agreement and then the called subscriber accepts the call.

The calling subscriber can be provided with a smart card that contains an identification code, for example a digital signature. In terms of the fee allocation, the card makes it possible for the calling subscriber to make a binding and irrevocable declaration, i.e. one that cannot be taken back later, to pay higher or all of the charges for the call. Security is thereby improved and the calling subscriber is also protected against undesired or unexpected charges.

The negotiation of the charges on the part of the called subscriber can be carried out by a new service (reachability manager) or via the called subscriber's terminal unit. If the caller agrees to pay higher charges, he transmits the caller-specific signal that is generated by means of the card to the telephone network, and the call is placed. The caller-specific signal is required as a guarantee that the agreed-upon acceptance of charges will not subsequently be rejected by the calling subscriber.

The method claimed by the invention for accepting charges, which can be implemented in existing IN (Intelligent Network) architectures, can be used for any type of telephone services on the called side, to guarantee billing of the fees for the service called.

The method claimed by the invention is also suitable for making possible a binding and non-disputable allocation of charges and costs for all types of telephone and communications services, such as a toll allocation for technical support calls.

In preferred embodiments of the method claimed by the invention, the caller-specific code sent is a digital code that represents a digitally signed response or is equivalent to one.

The card is required to guarantee that the acceptance of the charges will not be rejected at a later date.

Preferably, the caller-specific signal to be sent is stored in advance in the terminal unit of the calling subscriber, e.g. on a smart card that is inserted only as necessary into a card reader of the terminal unit, or is permanently installed in the terminal unit.

Using this method, it is possible, in particular, to agree on the allocation of charges both before the call is placed and also during the call.

On a telephone network that consists of terminal units and at least one central unit, which is constructed in a central network architecture, the central unit claimed by the invention has means to agree on a charge allocation between two terminal units to process a caller-specific signal transmitted from one terminal unit as a binding acknowledgment of this agreement.

In one preferred embodiment, the calls between the central unit and the terminal units are permanent or wireless connections.

In a terminal unit that has a card reader for a smart card, the invention teaches that if a charge allocation has been agreed upon, the terminal unit sends a caller-specific signal that is stored on the chip card to the central unit as a confirmation of this agreement.

An additional object of the invention is a smart card for use in a terminal unit of the telephone network described above. This smart card can either be inserted only as needed into a card reader of the terminal unit, or it can be installed permanently, e.g. in the form of a SIM chip, like those already used in the field of telecommunications transmission for subscriber identification. The invention teaches that the caller-specific signal is stored in the form of digital code on the smart card for the acknowledgment of an agreed-upon acceptance of charges. This digital code is preferably integrated on a SIM card that also contains the authorization data of the user.

BRIEF DESCRIPTION OF THE DRAWING

Additional advantages of the invention are described in greater detail below with reference to the accompanying drawing. Likewise, the invention teaches that the characteristics described above and those indicated below can also be used either individually or in any desired combinations. The exemplary embodiment described herein and illustrated in the accompanying drawing is not intended to be definitive or restrictive, but only as an example for the illustration of the invention.

The accompanying FIGURE is an extremely schematic diagram of a telephone network 1 with two terminal units 2 and 3.

DETAILED DESCRIPTION OF THE INVENTION

The first terminal unit 2 is a fixed station that is connected to a public switched telecommunications network 4, e.g. an ISDN (Integrated Services Digital Network). The second terminal unit 3 is a cellular unit that is connected to a public cellular network 5, such as a GSM for example, with an HLR (Home Location Register) data base 6.

In the GSM, under certain circumstances, the called subscriber (Subscriber B) must pay calling charges, as must the calling subscriber (Subscriber A). The decision of the called subscriber whether to accept the call may depend on the amount of the charges he will have to pay.

A GSM subscriber who is in the "roaming" area, e.g. outside the country, in the illustrated exemplary embodiment the second terminal unit 3, should be capable, by service profile management, of defining conditions for allocating charges and other reachability conditions with a reachability manager 7 in the HLR data base 6. Such reachability criteria can include the following, for example:

Calling subscriber number (e.g. a distinction between private and business callers);
Time of day of the call;
Calling charges (e.g. identified by the call country code), which have been negotiated with the caller.

As a function of the reachability conditions, all Subscriber B's incoming calls are filtered and, if appropriate, the calling charges are shared with the caller. To make possible charge allocations for the caller, the calling network, in the exemplary embodiment the telecommunications system 4, processes the charge allocation using the functions of an Intelligent Network (IN) 8. This process includes the authentication of the calling subscriber and the allocation of charges between the two cooperating networks 4, 5.

A smart card 9 enables the caller to give a binding response regarding the acceptance of charges to the central unit of the telephone network 1. A digital signature is stored on this smart card 9 in the form of an encrypted digital code, or an encrypted digital code is generated on the basis of data stored on the smart card 9. In the latter case, it is also possible that the code can be generated both on the smart card and in the terminal unit 1. By means of a card reader (not shown) in the first terminal unit 1, the digital signature can be read, which is then sent as a caller-specific signal for a binding confirmation of a charge allocation agreement. In response to this signal, the called subscriber accepts the call. For this purpose, the central unit has means to agree on sharing the charges between the two terminal units 2, 3, as well as means to process a caller-specific signal transmitted by the first terminal unit 2 as a confirmation of this agreement. This method improves security by protecting the roaming subscriber against accepting calls from unwanted callers and against unexpected calling charges.

Even if the calling subscriber's terminal unit, which is the first terminal unit 2 in the illustrated embodiment, is equipped with an intelligent or smart card, i.e. if Subscriber A is also a GSM subscriber, the above card use can be achieved by a multi-use SIM card and additional functionality in the HLR data base 6.

What is claimed is:

1. A method for the acceptance of calling charges by the calling subscriber (A) for individual calls over a telephone network (1), said method comprising the steps of:

forming a charge allocation agreement between a calling subscriber (A) and a called subscriber (B), initiating a call from the calling subscriber (A) to the called subscriber (B), sending a caller-specific signal by the calling subscriber (A) as a binding confirmation by the calling subscriber to pay the calling charges as part of the charge allocation agreement, and accepting the call by the called subscriber (B), wherein at least one of the calling subscriber and the called subscriber is directly connectable to a public cellular telephone network, and wherein the caller-specific signal is sent after the charge allocation agreement is formed.

2. A method as claimed in claim 1, wherein said sending step comprises sending the caller-specific signal in the form of a digital code.

3. A method as claimed in claim 1, wherein the caller-specific signal to be sent is stored in a terminal unit (2, 3) of the calling subscriber (A).

4. A method as claimed in one of the preceding claims, wherein the charge allocation is agreed upon before the call is made.

5. A telephone network (1) comprising terminal units (2, 3), for use by a calling subscriber and a called subscriber, and at least one central unit, which is constructed in a central network architecture, wherein said central unit agrees on the allocation of the calling charges between two terminal units (2, 3) and processes a caller-specific signal that is transmitted by one terminal unit (2, 3) of the calling subscriber and serves as a binding acknowledgment by the calling subscriber to pay the calling charges as part of the charge allocation agreement, wherein at least one of said terminal units is directly connectable to a public cellular telephone network, and wherein the caller-specific signal is transmitted after the charge allocation agreement is formed.

6. A telephone network as claimed in claim 5, wherein the connections between the central unit and the terminal units (2, 3) are permanent connections.

7. A smart card (9) for use in terminal units (2, 3) of a telephone network (1), said telephone network comprising terminal units (2, 3) and at least one central unit, and being constructed in a central network architecture, wherein said central unit agrees on the allocation of the calling charges between two terminal units (2, 3) and processes a caller-specific signal that is transmitted by one terminal unit (2, 3) of a calling subscriber and serves as a binding acknowledgment by the calling subscriber to pay the calling charges as part of the charge allocation agreement, wherein the caller-specific signal to confirm the agreed upon allocation of charges is derived from data stored on said smart card, wherein at least one of said terminal units is directly connectable to a public cellular telephone network, and wherein the caller-specific signal is transmitted after the charge allocation agreement is formed.

8. A terminal unit (2, 3) of a calling subscriber for use in a telephone network (1), said telephone network comprising terminal units (2, 3) and at least one central unit, and being constructed in a central network architecture, wherein said central unit includes means to agree on the allocation of the calling charges between two terminal units (2, 3) and means for processing a caller-specific signal that is transmitted by said terminal unit (2, 3) of the calling subscriber and serves as a binding acknowledgment by the calling subscriber to pay the calling charges as part of the charge allocation agreement, said terminal unit (2, 3) of the calling subscriber including a card reader for a smart card (9), wherein said terminal unit (2, 3) of the calling subscriber, if an allocation of charges has been agreed upon for a call, sends to said central unit the caller-specific signal that is derived from data stored on said smart card, wherein at least one of said terminal units is directly connectable to a public cellular telephone network, and wherein said terminal unit sends the caller-specific signal after the charge allocation agreement is formed.

9. A terminal unit (2, 3) according to claim 8, wherein the caller-specific signal is stored on said smart card (9).

10. A terminal unit (2, 3) according to claim 8, wherein the caller-specific signal is generated on the basis of date stored on said smart card.

11. A method as claimed in one of claims 1–3, wherein the charge allocation is agreed upon during the call.

12. A telephone network as claimed in claim 5, wherein the connections between the central unit and the terminal units (2, 3) are wireless connections.

13. A smart card (9) according to claim 7, wherein the caller-specific signal to confirm the agreed-upon allocation of charges is stored on said smart card (9) in the form of a digital code.

14. A smart card (9) according to claim 7, wherein the caller-specific signal to confirm the agreed-upon allocation of charges is generated on the basis of data stored on said smart card.

* * * * *